United States Patent [19]

Gleissner et al.

[11] Patent Number: 5,547,625
[45] Date of Patent: Aug. 20, 1996

[54] METHOD OF PRODUCING FLEXIBLE PLASTIC BANDS COMPOUNDED WITH HARD-MATERIAL POWDERS AND/OR SOLDERING POWDERS

[75] Inventors: Karlheinz Gleissner, Alzenau; Hans-Martin Ringelstein, Frankfurt am Main; Ekkehard Lange, Obertshausen, all of Germany

[73] Assignee: Degussa Aktiengesellschaft, Frankfurt, Germany

[21] Appl. No.: 178,565

[22] Filed: Jan. 7, 1994

[30] Foreign Application Priority Data

Jan. 8, 1993 [DE] Germany .................. 43 00 298.6

[51] Int. Cl.$^6$ .................. B29C 43/24; B29B 7/56
[52] U.S. Cl. .................. 264/122; 264/125; 264/175
[58] Field of Search .................. 264/56, 63, 125, 264/176.1, 337, 122, 175

[56] References Cited

U.S. PATENT DOCUMENTS

| | | | |
|---|---|---|---|
| 4,773,762 | 9/1988 | Albers | 366/69 |
| 5,019,311 | 5/1991 | Koslow | 264/122 |
| 5,080,843 | 1/1992 | Larker et al. | 264/62 |
| 5,198,489 | 3/1993 | Sterzel et al. | 524/439 |

FOREIGN PATENT DOCUMENTS 0231398  8/1987  European Pat. Off. .

OTHER PUBLICATIONS

Albers, A., "Aufbereiten mit dem Scherwalzenextruder", Kunststoffe (1992), vol. 82, pp. 982–987, with English language abstract.

*Primary Examiner*—Robert A. Dawson
*Assistant Examiner*—Kenneth M. Jones
*Attorney, Agent, or Firm*—Beveridge, DeGrandi, Weilacher & Young, L.L.P.

[57] ABSTRACT

In order to manufacture flexible plastic bands of a thermoplastic synthetic resin containing 40% or more by volume hard materials and/or soldering powder, two grooved and heated shearing rollers arranged parallel to one another and running in opposite directions are used onto which components are applied. The front shearing roller must have a temperature of 25° to 90° C. on the application side and of 30° to 80° C. on the removal side, the rear shearing roller must have a temperature of 30° to 130° C. on the application side and on the removal side of 35° to 100° C., and the temperature of the rear shearing roller must be at least 5° C. above the temperature of the front shearing roller. In addition, the front shearing roller must exhibit a speed of 5 to 25 rpms and the rear roller a speed which is 5 to 70% lower.

5 Claims, No Drawings

METHOD OF PRODUCING FLEXIBLE PLASTIC BANDS COMPOUNDED WITH HARD-MATERIAL POWDERS AND/OR SOLDERING POWDERS

INTRODUCTION AND BACKGROUND

The present invention concerns a method of producing flexible plastic bands formed of thermoplastic synthetic resins (for example of ethylene vinyl acetate copolymers) containing 40% or more by volume hard-material powder and/or soldering powder and 30% or less by volume plastic, the remainder being pores, by kneading the kneadable plastic with the hard-material powder and/or soldering powder at rather high temperatures. More particularly, the present invention relates to the above method wherein the components are placed (individually or as a granulate of the premixed components) onto two heated, grooved shearing rollers which are arranged parallel to one another and which run in opposite directions at different speeds.

In another aspect the present invention relates to flexible plastic band formed of thermoplastic synthetic resins (e.g., ethylene vinyl acetate copolymers) containing 40% or more by volume hard-material powder and/or soldering powder and 30% or less by volume plastic, the remainder being pores.

Methods of producing hard-material layers on metallic bases are known in which flexible plastic fleeces or films, containing hard materials and/or soldering powder, are placed on the bases and heated under a vacuum or under protective gas to temperatures at which the plastic decomposes without residue and the solder becomes liquid. The decomposition of the plastic creates a porous hard-material body whose pores are filled by the liquid solder, which brings about at the same time the bonding of the hard-material layer to the metallic base.

Such plastic fleeces or layers, which either separately contain hard-material particles and soldering powder or both powder types together, preferably consist of an ethylene vinyl acetate copolymer. They normally contain more than 40% by volume hard materials and/or solders and less than 30% by volume plastic. They preferably also contain 15 to 35% by volume pores.

Such fleeces or films and their manufacture are described, for example, in DE 38 01 958. Thus, the hard materials and/or soldering powder can be introduced into the plastic in that the plastic is softened and rendered viscous with a solvent in order to then add the hard-material particles and/or soldering-powder particles in a kneading machine. The mass produced in this manner is then rolled flat and the solvent expelled. If a heated kneading machine is used the work can also be performed without solvent in that the thermoplastic qualities of the plastic are utilized. These methods have the disadvantage that inhomogeneities and fluctuations of density within the fleeces readily occur on account of the volumetrically large amounts of hard materials and/or soldering powder.

Shearing roller mills like those described for example in EP 0,231,398 and EP 0,148,966 are known for mixing, homogenizing and plastifying plastics. They consist of two tempered rollers which are arranged parallel to one another, rotate in opposite directions at different circumferential speeds and are provided with sharp-edged grooves which comminute the material and transport the plastic from the one front side of the rollers, the application side, to the other front side, the removal side.

However, the method parameters described in the above patent documents are not suited for mixing and plastifying plastic masses which volumetrically contain more solids than plastifiable plastics.

SUMMARY OF THE INVENTION

An object of the present invention is to provide a method of producing flexible plastic bands (for example of ethylene vinyl acetate copolymers) which contain 40% or more by volume hard-material powder and/or soldering powder and 30% or less by volume plastic, remainder pores, by means of kneading the kneadable plastic with the hard-material power and/or soldering powder at rather high temperatures wherein the components are placed (individually or as a granulate of the premixed components) onto two heated, grooved shearing rollers which are arranged parallel to one another and which run in opposite directions at different speeds, at which time the hard-material powder and/or soldering powder is to be homogeneously distributed with the plastic.

Another object of the present invention is to provide flexible plastic band formed of thermoplastic synthetic resins (e.g., ethylene vinyl acetate copolymers) containing 40% or more by volume hard-material powder and/or soldering powder and 30% or less by volume plastic, the remainder being pores.

The present invention solves the prior art problem in that the front shearing roller is heated to 25°–90° C. on the application side and heated to 30°–80° C. on the removal side, the rear shearing roller is heated to 30°–130° C. on the application side and heated to 35°–100° C. on the removal side, and the temperature of the rear shearing roller must be at least 5° C. above the temperature of the front shearing roller and that the rear shearing roller exhibits a speed which is 5 to 70% less than that of the front shearing roller whose speed is approximately 5 to 25 rpms at a diameter of 100 to 160 mm. The rollers are internally heated and cooled to control temperatures.

DETAILED DESCRIPTION OF THE INVENTION

The groove arrangement of the shearing rollers corresponds to the groove arrangement according to EP 0,148,966 (U.S. Pat No. 4,605,309 which is incorporated by reference in its entirety and relied on specifically for the description and drawings of the apparatuses); however, more than two sharp-edged axial grooves with 1 to 20 mm width and 0.5 to 10 mm depth are applied. The removal range of the shearing rollers is 10 to 20% of the roller length and exhibits no grooves. It is preferable that no axial grooves are on the rear shearing roller.

The method of the present invention has proven itself especially well suited in the case of hard-material components and/or soldering components of 40 to 70% by volume and plastic components of 5 to 30% by volume.

It is necessary to apply the individual initial substances precisely (e.g., via weighing belts or screw dosing apparatuses) onto the application side of the shearing rollers. As a result of the differing temperatures and speeds, a product sheet forms around the front shearing roller into which the rear shearing roller presses the unworked, dosed-in material. As a consequence of the cooperation of the grooves and of the friction, the product sheet builds up in front of the roller gap, is comminuted and the rotating material to be kneaded is drawn in again. The product is mixed, homogenized and continuously transported from the application side to the removal side thereby.

It has proven to be advantageous to premix the initial materials at first in the desired composition in a kneader. The subsequently granulated material is then introduced into the apparatus preferably in the area of the second roller half. It is advantageous if a strip cutting unit is located on the removal side which is driven for example via gears by the front roller and can be hydraulically delivered for the removal of endless band or band strips. The product sheet coming from the front roller is cut upon delivery of the circular knives, removed by a stripper and falls onto a conveyor belt from which the endless bands are directly wound up and the band strips removed.

Hard-material powders are known in the art and include, for example, carbides such as tungsten carbide, molybdenum carbide, chromium carbide, tantalum carbide, titanium carbide, zirconium carbide, and nitrides such as titanium nitride.

Soldering powders are also known in the art and include, for example, solder alloys on a nickel basis containing 5–10% Cr, 2–6% Si, 2–4% Fe, 2–5% B and 0.03% C in addition to Ni. Soldering powders containing Cu, Ag, and Pd may also be used.

The following examples are intended to explain the method of the invention in further detail:

EXAMPLES

Example 1: 96.6% by weight chromium carbide (Grade A with a particle size of 1–6 micrometers; H. C. Strack, Berlin, Germany) was kneaded 30 min. at 130° C. in a kneader with 1.7% by weight copolymer mixture (Levapren 456/Levapren 8514 50/50% by weight) consisting of 55% by weight ethylene and 45% by weight vinyl acetate (available under the trade name of Levapren 456, lenticular form, copolymer of 55% ethylene and 45% vinyl acetate, Bayer AG, Leverkusen, Germany) and of 32% by weight ethylene and 68% by weight vinyl acetate (available under the trade name of Levapren 8514, lenticular form, copolymer of 68% ethylene and 32% vinyl acetate, Bayer AG, Leverkusen, Germany). This weight ratio corresponds to 80.6% by volume hard material and 19.4% by volume plastic. After the mass had cooled down it was granulated and continuously introduced in the first third of the second half of the shearing roller. The temperature of the front roller was 55°–60° C. and that of the rear roller 72°–76° C. thereby. The front roller rotated at 8–10 rpms and the rear roller at 5–7 rpms and the rollers were provided with flutes and axial grooves in accordance with EP 0,148,966. Band pieces 62 mm wide with a thickness of 1 mm, length 300–540 mm, density 4.4 g/cm$^3$; thickness 2 mm, length 260–380 mm, density 4.2 g/cm$^3$ and thickness 3 mm, length 250–320 mm, density 4.1 g/cm$^3$ were removed.

Example 2: 97.9% by weight chromium carbide (Grade A with a particle size of 10–20 micrometers; H. C. Strack, Berlin, Germany) was kneaded with 1.05% by weight copolymer (Levapren 456/Levapren 8514 50/50% by weight) consisting of ethylene/vinyl acetate 55/45% by weight and of 1.05% by weight copolymer ethylene/vinyl acetate 68/32% by weight for 30 min. at 130° C. (87.2% by volume hard material, 12.8% by volume plastic). The subsequently granulated material was introduced to the start of the second half of the shearing rollers through a vibrating channel. The roller parameters were 46°–57° C. and 9–22 rpms for the front roller and 64°–66° C. and 5–14 rpms for the rear roller. 53 mm and 62 mm wide bands with a thickness of 1 mm, length 100 mm endless, density 4.5 g/cm$^3$; thickness 2 mm, length 330–440 mm, density 4.3 g/cm$^3$; and thickness 3 mm, length 160–350 mm, density 4.2 g/cm$^3$ were manufactured. The rear roller exhibited no axial grooves thereby.

Example 3: A mixture of chromium carbide (Grade A with a particle size of 10–20 micrometers; H. C. Strack, Berlin, Germany) and tungsten carbide (HC 1000 with a particle size of <10 micrometers; H. C. Strack, Berlin, Germany) with 50/50% by volume was applied with 1% by weight copolymer (Levapren 456/Armeen DM 18D 80/20% by weight) consisting of ethylene/vinyl acetate 55/45% by weight and of 0.3% by weight fatty acid (octadecyldimethylamine available under the trade name of Armeen DM 18D, Akzo Chemicals GmbH, Dueren, Germany) separately to the start of the first half of the shearing roller extruder (88.5% by volume hard materials, 8.3% by volume plastic). The mixing and homogenization took place directly via the shearing roller extruder. A band with a thickness of 2 mm, width 53 mm and length of approximately 300 mm with a density of 7.3 g/cm$^3$ was manufactured. On the front roller the temperature on the application side was 75°–80° C., on the removal side 45°–50° C. and it exhibited a speed of 9 rpms. On the rear roller the temperature on the application side was 115°–120° C., on the removal side 65°–70° C. and it exhibited a speed of 7 rpms.

Example 4: 98.5% by weight tungsten carbide (HC 1000 with a particle size <10 micrometers; H. C. Strack, Berlin, Germany) was kneaded in a kneader at 130° C. for one half hour with 0.75% by weight copolymer (Levapren 456/Levapren 8514 50/50% by weight) consisting of ethylene/vinyl acetate 55/45% by weight and with copolymer consisting of ethylene/vinyl acetate 68/32% by weight (80.4% by volume hard material, 19.6% by volume plastic). The application of the granulated mixture took place on the start of the second half of the working area of the shearing roller extruder. The front roller rotated at 8–9 rpms and had a temperature of 49°–52° C. and the rear roller rotated at 4–6 rpms and had a temperature of 63° C. Band widths of 53 and 62 mm with thicknesses of 1 and 2 mm were able to be manufactured in this manner. The 1 mm thick band pieces and endless bands had a density of 10.6 g/cm$^3$ and the 2 mm thick band pieces 370–450 mm long a density of 10.3 g/cm$^3$.

Example 5: A band of 97.2% by weight tungsten carbide (HC 1000 with a particle size <2 micrometers; H. C. Strack, Berlin, Germany) with a copolymer (Levapren 456/Levapren 8514 40/60% by weight) consisting of 1.2% by weight ethylene/vinyl acetate 55/45% by weight and of 1.6% by weight ethylene/vinyl acetate 68/32% by weight was produced on a shearing roller extruder with the dimensions of 62 mm width, 2 mm thickness and 100–300 mm length and with a density of 8.6 g/cm$^3$ (68.4% by volume hard material, 31.6% by volume plastic). To this end the materials were kneaded in a kneader at 130° C. for 30 minutes, then granulated and processed on the last third of the second half of the shearing rollers. The temperature of the front roller rotating at 12 rpms was 50°–55° C. thereby and that of the rear roller rotating at 7 rpms 60°–65° C. The front and the rear roller were provided only with flutes thereby.

Example 6: 98.7% by weight soldering powder of nickel with 8% boron and 5% silicon (powder L-N12, particle size <100 micrometers, Gotek GmbH, Frankfurt/Main or Boehler AG, Duesseldorf, Germany) compounded with a copolymer (Levapren 456/Levapren 8514 50/50% by weight) consisting of 0.65% by weight ethylene/vinyl acetate 55/45% by weight and a copolymer consisting of 0.65% by weight ethylene/vinyl acetate 68/32% by weight was granulated after 30 minutes kneading at 130° C. in a mill (90.5% by volume soldering powder, 9.5% by volume plastic). The granulate was applied via a vibrating groove onto the last third of the first half of a shearing roller extruder. The front roller had a speed of 9–16 rpms and its temperature was 56°–58° C. The rear roller rotated at 6—rpms and its temperature was adjusted to 64°–68° C. Band pieces up to 450 mm in length, 62 mm wide and with thicknesses of 0.7, 1.5 and 2.3 mm were manufactured. The densities were 5/7 g/cm$^3$ for a band 0.7 mm thick, 5.6 g/cm$^3$ for a band 1.5 mm thick, and 5.5 g/cm$^3$ for one 2.3 mm thick.

Further variations and modifications of the foregoing will be apparent to those skilled in the art and such variations and modifications are attended to be encompassed by the claims that are appended hereto.

U.S. Pat No. 4,773,762 is incorporated by reference in its entirety and relied on specifically for the description and drawings of the apparatuses.

What is claimed:

1. A method of producing a flexible plastic band of thermoplastic synthetic resin containing ≧40% by volume hard-material powder and/or soldering powder and ≦30% by volume plastic, remainder pores, said method comprising kneading a thermoplastic synthetic resin with a hard-material powder and/or soldering powder, wherein (a) said thermoplastic synthetic resin together with said hard-material power and/or soldering powder are individually placed, or (b) a granulate of a mixture of said thermoplastic synthetic resin together with said hard-material powder and/or soldering powder are placed, onto a grooved front shearing roller and an optionally grooved rear shearing roller which are arranged parallel to one another and run in opposite directions at different speeds, wherein said front shearing roller and said rear shearing roller have an application side and a removal side, wherein said front grooved shearing roller has a temperature of 25° to 90° C. on said application side and a temperature of 30° to 80° C. on said removal side and said rear optionally grooved shearing roller has a temperature of 30° to 130° C. on said application side and a temperature of 35° to 100° C. on said removal side and the temperature of said rear optionally grooved shearing roller is at least 5° C. above the temperature of said front grooved shearing roller and said rear optionally grooved shearing roller exhibits a speed which is 5 to 70% less than that of said front grooved shearing roller, wherein the speed of said front grooved shearing roller is approximately 5 to 25 rpms at a diameter of 100 to 160 mm.

2. The method according to claim 1, wherein said band contains 40–70% by volume of said hard-material powder and/or soldering powder and 5–30% by volume of said plastic.

3. The method according to claim 1, wherein said thermoplastic synthetic resin is ethylene vinyl acetate copolymer.

4. The method according to claim 1, wherein said rear optionally grooved shearing roller is not grooved.

5. The method according to claim 1, said method consisting essentially of kneading a thermoplastic synthetic resin with a hard-material powder and/or soldering powder, wherein (a) said thermoplastic synthetic resin together with said hard-material power and/or soldering powder are individually placed, or (b) a granulate of a mixture of said thermoplastic synthetic resin together with said hard-material powder and/or soldering powder are placed, onto a grooved front shearing roller and an optionally grooved rear shearing roller which are arranged parallel to one another and run in opposite directions at different speeds, wherein said front shearing roller and said rear shearing roller have an application side and a removal side, wherein said front grooved shearing roller has a temperature of 25° to 90° C. on said application side and a temperature of 30° to 80° C. on said removal side and said rear optionally grooved shearing roller has a temperature of 30° to 130° C. on said application side and a temperature of 35° to 100° C. on said removal side and the temperature of said rear optionally grooved shearing roller is at least 5° C. above the temperature of said front grooved shearing roller and said rear optionally grooved shearing roller exhibits a speed which is 5 to 70% less than that of said front grooved shearing roller, wherein the speed of said front grooved shearing roller is approximately 5 to 25 rpms at a diameter of 100 to 160 mm.

* * * * *